United States Patent
Noda et al.

(10) Patent No.: US 9,361,918 B2
(45) Date of Patent: Jun. 7, 2016

(54) MEMORY DISK DRIVE DEVICE AND RESIN COMPONENT THEREFOR

(75) Inventors: Hiroyuki Noda, Mie (JP); Hiroshi Niwa, Mie (JP)

(73) Assignee: NTN CORPORATION, Osaka (JP)

( * ) Notice: Subject to any disclaimer, the term of this patent is extended or adjusted under 35 U.S.C. 154(b) by 39 days.

(21) Appl. No.: 14/130,495

(22) PCT Filed: Jun. 29, 2012

(86) PCT No.: PCT/JP2012/066656
§ 371 (c)(1),
(2), (4) Date: Jan. 1, 2014

(87) PCT Pub. No.: WO2013/005664
PCT Pub. Date: Jan. 10, 2013

(65) Prior Publication Data
US 2014/0118858 A1  May 1, 2014

(30) Foreign Application Priority Data

Jul. 1, 2011  (JP) .................................. 2011-147750
May 9, 2012  (JP) .................................. 2012-107754

(51) Int. Cl.
*G11B 33/14* (2006.01)
*G11B 19/20* (2006.01)
*G11B 21/08* (2006.01)
(Continued)

(52) U.S. Cl.
CPC .............. *G11B 5/5565* (2013.01); *C09K 21/14* (2013.01); *G11B 5/5569* (2013.01); *G11B 19/2009* (2013.01); *G11B 21/22* (2013.01); *G11B 25/043* (2013.01); *G11B 33/1406* (2013.01)

(58) Field of Classification Search
None
See application file for complete search history.

(56) References Cited

U.S. PATENT DOCUMENTS 5,585,989 A    12/1996  Kuromiya et al.
5,770,905 A *  6/1998  Suzuki et al. ......... H02K 21/145
                                                          310/216.108
(Continued)

FOREIGN PATENT DOCUMENTS

EP        0655734 A1     5/1995
JP     61-259981 A      11/1986
(Continued)

OTHER PUBLICATIONS

Technical Note, Sumitomo Chemical Company, Limited; Sumika Super LCP Liquid Crystalline Polyester, Version 01; Sep. 2010.
(Continued)

*Primary Examiner* — Craig A. Renner
(74) *Attorney, Agent, or Firm* — Hedman & Costigan, P.C.; James V. Costigan; Kathleen A. Costigan

(57) ABSTRACT

The invention provides a resin component used within a memory disk drive device and a highly reliable memory disk drive device using the resin component, the resin component having excellent flame resistance and minimal outgas. A resin component used inside a memory disk drive device (1), the resin component being an insulating bushing for protecting a lead of a motor (2) when the lead is connected to a circuit board; a carriage (4) being molded integrally with a coil for driving a swing arm (3) provided with a pickup head (3*a*) for reading or writing information on a memory disk on a distal end thereof, and the carriage adapted for balancing the weight of the swing arm (3); or a ramp (5) for retracting the pickup head (3*a*) when the memory disk stops.

10 Claims, 4 Drawing Sheets

(51) Int. Cl.
  *G11B 21/22*   (2006.01)
  *G11B 25/04*   (2006.01)
  *G11B 5/55*    (2006.01)
  *C09K 21/14*   (2006.01)
  *G11B 5/54*    (2006.01)

(56) References Cited

U.S. PATENT DOCUMENTS

| | | | | |
|---|---|---|---|---|
| 5,880,545 | A * | 3/1999 | Takemura et al. | 360/99.08 |
| 2005/0041334 | A1* | 2/2005 | Kim et al. | 360/97.16 |
| 2005/0054763 | A1* | 3/2005 | Kobayashi et al. | G11B 17/04 524/494 |
| 2006/0138886 | A1* | 6/2006 | Ito et al. | 360/99.21 |
| 2007/0290391 | A1* | 12/2007 | Kamo et al. | 264/104 |
| 2008/0037175 | A1 | 2/2008 | Horio | |
| 2009/0034888 | A1* | 2/2009 | Ito et al. | 384/112 |

FOREIGN PATENT DOCUMENTS

| | | |
|---|---|---|
| JP | 07-210855 A | 8/1995 |
| JP | 07-322543 A | 12/1995 |
| JP | 2001-126431 A | 5/2001 |
| JP | 2006-046430 A | 2/2006 |
| JP | 2009-211776 A | 9/2009 |
| JP | 2011-074396 A | 4/2011 |
| WO | 2005/116137 A1 | 12/2005 |

OTHER PUBLICATIONS

International Search Report from PCT/JP2012/066656; Sep. 25, 2012.
Supplementary European Search Report from EP 12807836 dated Sep. 24, 2015, mailed Oct. 2, 2015.
Panlite MN-4800 Series; dated Jun. 1, 2010; retrieved from the Internet on Sep. 22, 2015.

* cited by examiner

MEMORY DISK DRIVE DEVICE AND RESIN COMPONENT THEREFOR

TECHNICAL FIELD

The present invention relates to a memory disk drive device, and more particularly, to a resin component used inside a memory disk drive device.

BACKGROUND ART

The increasing memory densities of memory disk drive devices such as hard disk drives has necessitated very strict levels of cleanliness in that the interior of the drives must be free of dirt as well as ion contamination and outgassing from the materials of the various components. A characteristic demanded of the internal components is the flammability standard UL 94 V-0, and a polybutylene terephthalate (PBT) material containing a phosphorus-based flame retardant has previously been used to satisfy this characteristic. Outgassing caused by this flame retardant, however, has been a problem.

For the housing of a memory disk drive device, a resin housing has been known in which a resin material, such as a polyimide (hereafter abbreviated PI), polyamide imide (hereafter abbreviated PAI), polyether ether ketone (hereafter abbreviated PEEK), polyphenylene sulfide (hereafter abbreviated PPS), or liquid crystal polymer (hereafter abbreviated LCP) resin, contains carbon fibers and/or inorganic fiber as a filler (see Patent Document 1).

For the configuration of an insulating bushing incorporated inside a memory disk drive device, an insulating bushing has been known in which a cylindrical member is disposed so as to cover the inside of a lead-out hole formed in a fixing member for fixing a stator of a motor (see Patent Document 2).

As means of reading and writing data in a memory disk drive device, a swing-type hard disk carriage has been known which reads and writes data at an arbitrary track position by causing a swing arm provided with a pickup magnetic head to move radially to the surface of a disk (see Patent Document 3). This hard disk carriage has a ring voice coil and a concave part disposed in a predetermined location of a molding resin for sealing together the voice coil and the carriage components, and having a hardened molten material of high specific gravity packed into the concave part to function as a balancer.

A ramp for a hard disk drive has been known as a resin component for retracting a pickup magnetic head for a memory disk drive device when the disk is stopped. For this resin component, a polyoxymethylene resin ramp for a hard disk drive has been known in which a polyoxymethylene resin contains an inorganic pigment selected from among a group consisting of zinc oxide, titanium oxide, metal complex oxides, iron oxide, ultramarine, cobalt blue, calcination pigments, carbon black, acetylene black, and lamp black, and has an outgassing level of 20 µg/g or less and harmful components in the outgas of 0.3 µg/g or less (see Patent Document 4).

PRIOR ART DOCUMENT

Patent Document

Patent Document 1: Japanese Laid-open Patent Publication No. 2006-46430

Patent Document 2: Japanese Laid-open Patent Publication No. H7-322543

Patent Document 3: Japanese Laid-open Patent Publication No. 2009-211776

Patent Document 4: Japanese Laid-open Patent Publication No. 2011-74396

SUMMARY OF THE INVENTION

Problems to be Solved by the Invention

A problem, however, is the difficulty of selecting a resin material which, besides satisfying the flammability standard, also generates little outgas. For example, although a PBT resin having a phosphorus-based flame-retardant additive complies with the flammability standard UL 94 V-0, it has significantly increased generation of outgas due to the narrow range of optimum temperatures at which to set the resin temperature during molding.

Increasing memory density in memory disk drive devices is accompanied by an increase in the density to which components are arranged therein. For example, insulating bushings through which a lead is led from a stator coil have a strict arrangement, such as having narrow lead-out holes through which the lead is to be led.

To minimize outgas in a disk, paraffin-free polyurethane wires whose surface is not coated with the conventional surface lubricant paraffin have been used for the winding of the stator coil. These are ultra-fine polyurethane wires measuring about 0.001-0.5 mm in diameter. Therefore, flame resistance and low generation of outgas are especially demanded of the resin material of the insulating bushing, and the tendency of the insulating bushing to damage the lead from the stator coil must be addressed.

A hard disk carriage is integrally molded with a voice coil. Depending on molding conditions or the type of outgas, a voice coil may cause insulation deterioration, such as microcracks in the surface. Therefore, with increasing memory density in memory disk drive devices, maintaining the insulating characteristics of the resin material and the insulation of the insulating materials in a memory disk drive device becomes more important when selecting a resin material.

The present invention was developed to address such problems, it being an object thereof to provide a resin component having excellent flame resistance, minimal outgassing, and high reliability, and a highly reliable memory disk drive device using the resin component.

Means for Solving the Problem

The resin component of the present invention is used inside a memory disk drive device, and is (1) an insulating bushing for protecting a lead of a motor when the lead is connected to a circuit board, (2) a carriage being molded integrally with a coil for driving a swing arm provided with a pickup head for reading or writing information on a memory disk on a distal end thereof, and the carriage adapted for balancing the weight of the swing arm, or (3) a ramp for retracting the pickup head when the memory disk stops. This resin component is characterized in being a resin article molded from an amorphous resin, a crystalline resin, or an LCP resin, and having 30 ppm or less of outgas as measured using headspace gas chromatography upon sealing 5 g of the molded resin article in air in a tightly sealed 20-mL container and leaving the article to stand at a temperature of 120° C. for 20 hours. The resin component is especially characterized in being an insulating bushing.

The molded resin article is characterized in that the second-order transition point is 85° C. or greater. In this context, the second-order transition point is the second-order transition point measured by differential scanning calorimetry (DSC).

The amorphous resin is characterized in being a polycarbonate (hereafter abbreviated PC) resin. The crystalline resin is characterized in being at least one resin selected from among PPS resins, polyamide (hereafter abbreviated PA) resins, PEEK resins, and PI resins. The LCP resin is characterized in being an aromatic polyester resin. The aromatic polyester resin is especially characterized in being a copolymer containing repeating units derived from p-hydroxybenzoic acid, dihydroxybiphenyl, and benzene dicarboxylic acid.

The molded resin article is characterized in being an insulator compounded with inorganic filler. The inorganic filler is especially characterized in being a fibrous or flaked filler.

The molded resin article has the characteristic that the deflection temperature under load (1.8 MPa) is 120° C. or greater. The resin material of the molded resin article has the characteristic that the melt volume-flow rate measured at 300° C. under a load of 1.2 kg according to ISO 1133 is 5 cm$^3$/10 min or greater.

The memory disk drive device of the present invention is a memory disk drive device comprising a motor for causing a memory disk to rotate, an insulating bushing for protecting a lead of the motor when the lead is connected to a circuit board; a carriage being molded integrally with a coil for driving a swing arm provided with a pickup head for reading or writing information on a memory disk on a distal end thereof, and the carriage adapted for balancing the weight of the swing arm; a ramp for retracting the pickup head when the memory disk stops; and a housing for housing the motor, the insulating bushing, the carriage, and the ramp; at least one of the insulating bushing, the carriage, and the ramp is the resin component of the present invention.

Effect of the Invention

In the memory disk drive device of the present invention, at least one of an insulating bushing, a carriage, and a ramp, which are resin components arranged inside the housing, is a molded resin article made of an amorphous resin, a crystalline resin, or an LCP resin; and the molded resin article has 30 ppm or less outgas; therefore, the reliability of a memory disk drive device having increasingly high density is improved. The molded resin is compounded with an inorganic filler, and is thereby obtained as an article having improved mechanical strength and compatibility with the flammability standard UL 94 V-0.

In the case that the molded resin article is an insulating bushing, thermal deformation or the like when (heating and) sealing using an epoxy adhesive can be prevented because the molded article has a deflection temperature under load (1.8 MPa) of 120° C. or greater.

The resin material of the molded resin article has excellent resin fluidity and can be molded by high cycle molding because the melt volume-flow rate is 5 cm$^3$/10 min or greater. This allows manufacturing costs to be reduced.

MODE FOR CARRYING OUT THE INVENTION

Figure 1:
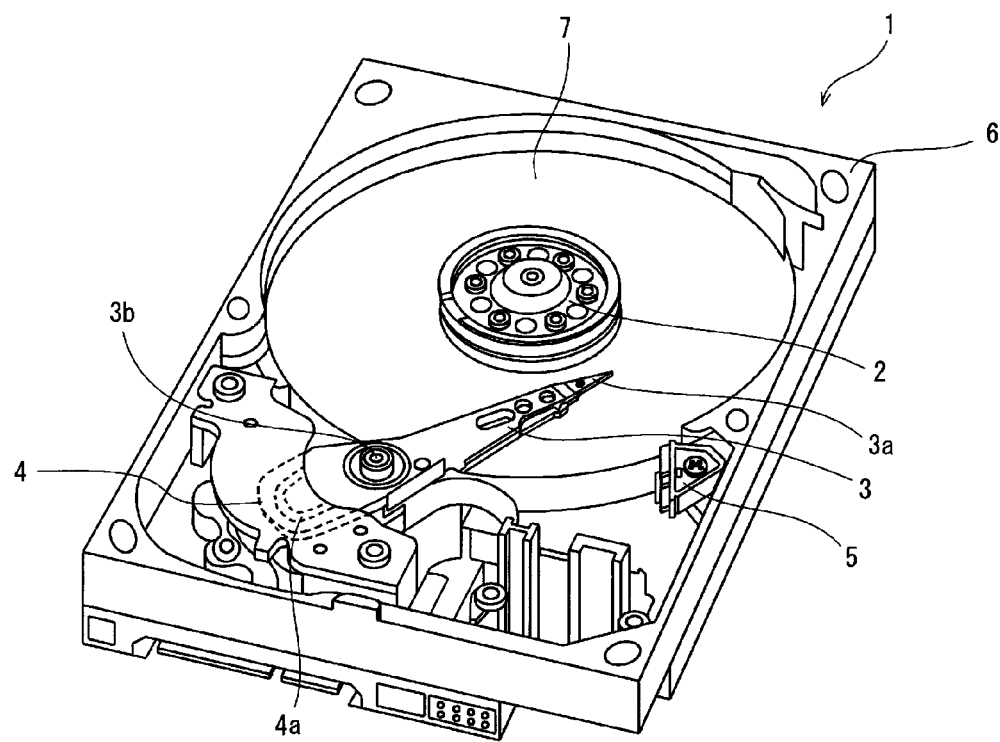
FIG. 1 is a perspective view of a memory disk drive device with the upper cover removed.

The resin component of the present invention (resin molded article) is (1) an insulating bushing, (2) a carriage, or (3) a ramp used inside a memory disk drive device. A memory disk drive device using the resin component of the present invention will be described with reference to FIG. 1. FIG. 1 is a perspective view of a memory disk drive device with the upper cover removed. The memory disk drive device 1 is a disk device for reading information from a disk 7 and writing information to the disk 7 using a pickup head 3a disposed on the end of a swing arm 3 while the disk 7, which is fixed to a motor 2 inside a resin housing 6, is caused to rotate. A carriage 4, molded integrally with a coil 4a for swinging the swing arm 3 centered on a shaft 3b, is disposed for balancing the weight of the swing arm 3. A ramp 5, for retracting the pickup head 3a when the disk 7 stops, is disposed inside the resin housing 6.

Figure 2:
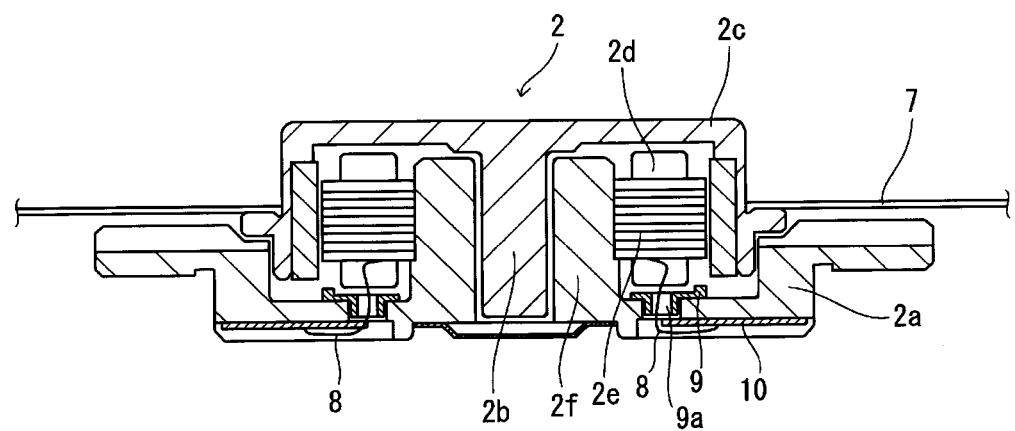
FIG. 2 is an enlarged longitudinal sectional view of motor components.

FIG. 2 is an enlarged longitudinal sectional view of the components of a spindle motor 2 having a fluid dynamic bearing for a bearing. The motor 2 has a base 2a fixed to the housing 6 of the memory disk drive device 1, and a rotating portion 2c on which the disk 7 is mounted and which rotates about a central shaft 2b. On the base 2a are a bearing portion 2f for supporting a stator core 2d, a coil 2e, and the rotation shaft 2b. The stator coil 2d and the coil 2e, which constitute the motor 2, function as a magnetic flux generator for generating a magnetic flux in response to a drive current. The coil 2e comprises a winding wound around the stator core 2d, and a lead 8 from the coil 2e is connected through a through-hole 9a disposed in the insulating bushing 9 to a circuit board 10 disposed on the base 2a. The insulating bushing 9 is press-fitted into an aluminum bracket.

Figure 3:
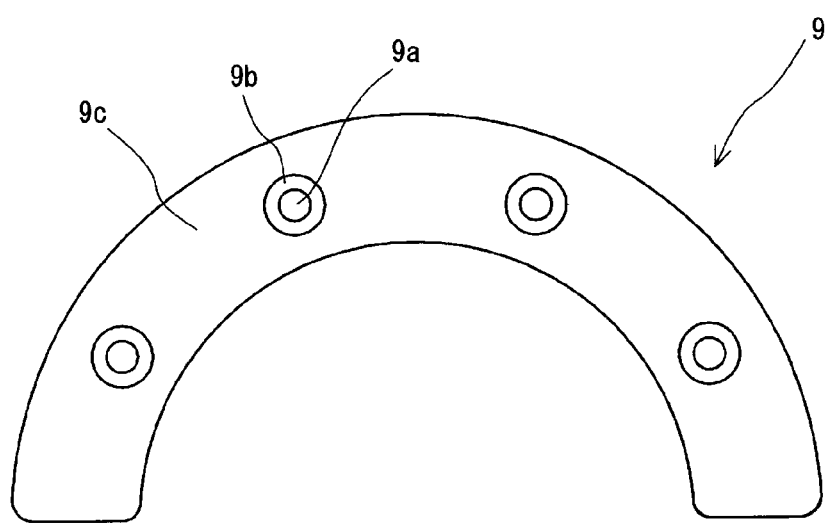
FIG. 3 is an enlarged plan view of an insulating bushing.

FIG. 3 shows an enlarged plan view of the insulating bushing 9. The insulating bushing 9 is formed by integrally molding four cylindrical portions 9b, having through-holes 9a, of resin along an arc on a semicircular arc plate 9c. Disposing the insulating bushing 9 in two places on the base 2a underneath the coil 2e attaches insulating bushings along the whole circumference of a portion corresponding to the location of the stator core 2d. The lead 8 from the coil 2e is guided through the inside of the through-hole 9a and connected to the circuit board 10.

The insulating bushing 9 has a property as an insulator for electrically protecting the lead 8, and a property providing mechanical protection such as minimizing stretching when handling the lead 8. The coating of a urethane wire or the like wound around the stator core 2d is prone to environmental deterioration, such as micro crazing, due to mechanical stress on the lead 8 and the winding of the urethane wire or the like. In such a case, it is demanded that the molded resin article used for the insulating bushing 9 be a molded resin article with little outgas because increased outgas from the molded resin article tends to accelerate insulation deterioration of the winding and the like.

Figure 4:
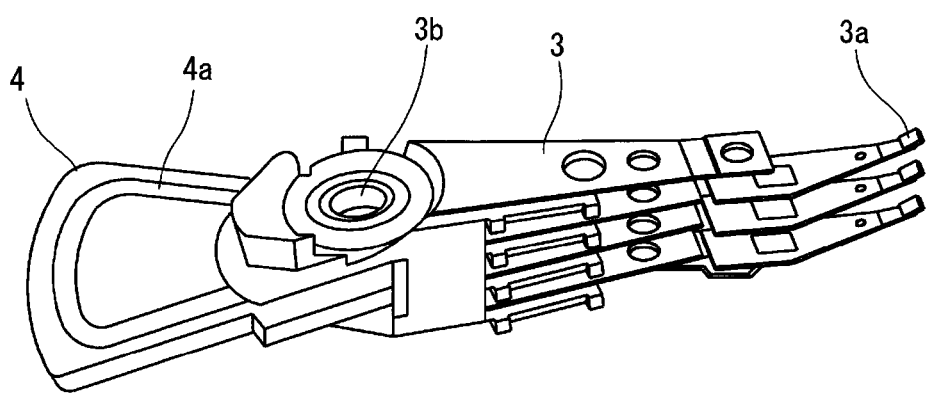
FIG. 4 is an enlarged perspective view of a carriage molded integrally with a swing arm.

FIG. 4 shows an enlarged perspective view of a carriage molded integrally with a swing arm disposed on the end of a pickup head. The carriage 4 is molded integrally with the swing arm 3. The voice coil 4a is disposed integrally with the carriage 4. The voice coil 4a is wound with a winding of a urethane wire or the like. Therefore, it is demanded that the molded resin article used for the carriage 4, like the molded resin article used for the insulating bushing 9, be a molded resin article with little outgas.

The ramp 5 for retracting the pickup head 3a when the memory disk 7 stops as shown in FIG. 1 is a molded resin article used for the memory disk drive device 1. In order to safely retract the pickup head 3a when the memory disk 7 stops, the molded resin article needs to be have minimal outgas contaminating the pickup head 3a.

The molded resin article comprising the resin component of the present invention has 30 ppm or less outgas from the molded resin article when measured using headspace gas chromatography. The outgas is more preferably 20 ppm or less, and even more preferably 15 ppm or less. A greater than 30 ppm outgas reduces the durability of the memory disk drive device. In the case that the molded resin article contains additives such as an inorganic filler, the molded resin article molded from a resin composition containing these additives should satisfy the outgas limitation described earlier.

More specifically, the outgas in the resin component of the present invention is the level of outgas measured by a headspace-GC/MS method indicated hereinafter. The resin composition is molded in the configuration of an insulating bushing, a carriage, and a ramp using molds at the optimum molding temperature of the resin composition. A glass container having an inner diameter of 20 mm and a height of 70 mm (volume: 20 mL) is prepared. A resulting molded article 5 g is cut so as to fit in the container, and left sealed in air in the container at a temperature of 120° C. for 20 hours. Once volatile gas components between the sample and the space in the upper portion of the glass container (the headspace) have reached equilibrium or a steady state, a predetermined volume of gas-phase components is collected and introduced into the GC/MS system to measure the level of outgas. The measurement is calculated as the concentration contained in the glass container.

Gases of siloxane, sulfides, sulfur, and halides are undesirable outgases. Therefore, use of silicone resins and additives which tend to generate siloxane-based gases is undesirable.

The molded resin article comprising the resin component of the present invention preferably has a second-order transition point of 85° C. or greater as well 30 ppm or less outgas. A second-order transition point less than 85° C. impairs dimensional stability during use.

Amorphous resins, crystalline resins, and liquid crystal polymer resins will be described which can be used in the resin components of the present invention of the insulating bushing 9, the carriage 4, or the ramp 5.

The amorphous resin is, for example, a PC resin, a polyether imide resin, a polyphenyl sulfone resin, a polyether sulfone resin, a polyphenylene ether resin, or a polyamide imide resin. Among these resins, PC resins are preferred for their convenience in terms of cost.

PC resins are obtained by reacting phosgene with a dihydroxy compound such as bisphenol, and by reacting a dihydroxy compound with a carboxylic acid ester such as diphenyl carbonate. The PC resin is preferably an aromatic PC resin, and especially preferably a bisphenol-based aromatic PC resin. The PC resin is preferably a flame-retardant PC resin having enhanced flame resistance by containing, for example, an organic alkali metal salt, an organic alkali earth metal salt, or a PTFE resin as a flame retardant without containing a phosphorus- or halogen-based flame retardant. An example of a commercial flame-retardant PC resin is the Panlite MN4800 series made by Teijin Chemicals.

The crystalline resin is, for example, a PPS resin, a PA resin, a PEEK resin, and/or a PI resin.

Depending on the molecular structure, there are several types of PPS resins, such as crosslinked, semi-crosslinked, linear, and branched, all of which can be used in the present invention without restrictions as to molecular structure or molecular weight. Examples of commercial PPS resins are #160 made by Tosoh Corporation, and T4AG made by DIC Corporation.

The PA resin is preferably an aromatic PA resin, examples of which are PA9T resins, PA6T resins, and polyamide MXD-6 resins.

PEEK resins are crystalline thermoplastic resins having a chemical structure in which a benzene ring is linked in the para position by ether linkage to a carbonyl. Examples of commercial PEEK resins are PEEK (such as 90P, 150P, 380P, or 450P) made by Victrex, KetaSpire (such as KT-820P or KT-880P) made by Solvay Advanced Polymers, and VESTA-KEEP (such as 1000G, 2000G, 3000G, or 4000G) made by Daicel-Degussa.

PI resins are preferably thermoplastic polyimide resins having a plurality of ether linkages showing suitable molten characteristics when subjected to energy such as heat in the repeating units of the molecular structure, even though an imide group having excellent properties, such as thermal characteristics and mechanical strength, surrounds an aromatic group. An example of such a commercial PI resin is AURUM made by Mitsui Chemicals.

The LCP resin is, for example, an aromatic polyester resin, an aromatic polyester imide resin, or an aromatic polyester amide resin. Among these resins, an aromatic polyester resin is preferred, and a copolymer containing repeating units derived from p-hydroxybenzoic acid, dihydroxybiphenyl, and benzene dicarboxylic acid is especially preferred. Examples of such LCP resins are the SUMIKASUPER LCP E4000, E5000, and E6000 series made by Sumitomo Chemical.

A powdered LCP manufactured by the following method is optimally used as an LCP resin. A reactor provided with a stirrer, a torque meter, a nitrogen gas introduction tube, a thermometer, and a reflux condenser was charged with 994.5 g (7.2 mol) of p-hydroxybenzoic acid, 446.9 g (2.4 mol) of 4,4'-dihydroxybiphenyl, 299.0 g (1.8 mol) of terephthalic acid, 99.7 g (0.6 mol) of isophthalic acid, and 1347.6 g (13.2 mol) of acetic anhydride. After the reactor had been thoroughly purged with nitrogen gas, the temperature was raised to 150° C. over thirty minutes under a nitrogen stream, and the system was refluxed at the same temperature for three hours. Subsequently, the temperature was raised to 320° C. over two hours and fifty minutes while distilled byproduct acetic acid and unreacted acetic anhydride were distilled off. The contents were removed upon recognizing the point when increased torque was found as the end of the reaction. After the resulting solid content was cooled to room temperature and crushed using a coarse crusher, the temperature was raised in a nitrogen atmosphere from room temperature to 250° C. over one hour and from 250° C. to 280° C. over five hours, and kept at 280° C. for three hours to continue solid-phase polymerization. This method produced powdered LCP having a flow beginning temperature of 327° C.

The molded resin article is preferably a molded resin article that does not solely comprise the resin, but is further compounded with an inorganic filler, the molded resin article especially preferably being an insulator containing an inorganic filler. Inorganic fillers are preferred for their capacity to minimize generation of outgas.

Fibrous or flaked fillers are preferred as the inorganic filler for their superior moldability. Examples of fibrous fillers are glass fibers and whiskers. These fibrous fillers may be used alone or in combination.

Examples of commercial glass fibers are milled fibers (such as MF06JB1-20, 20JJH1-20, 06MW2-20, or 20MH2-

20) made by Asahi Fiber Glass, and milled fibers (such as EFH75-01, EFH100-31, EFH150-01, EFH150-31, or EFDE50-01) made by Central Glass.

Examples of whiskers are wollastonite whiskers, calcium sulfate whiskers, calcium carbonate whiskers, potassium titanate whiskers, aluminum borate whiskers, magnesium borate whiskers, titanium oxide whiskers, silicon nitride whiskers, silicon carbide whiskers, alumina whiskers, and mineral fibers formed by melting, working, and refining igneous rocks.

Examples of flaked fillers are glass flakes and boron nitride. These flaked fillers may be used alone or in combination. A fibrous filler and a flaked filler may be used together as the inorganic filler.

The molded resin article may contain molybdenum disulfide as an inorganic solid lubricant, or a PTFE resin or the like as an organic solid lubricant. Containing these solid lubricants improves fluidity during molding, and improves handling of the lead when the molded resin article is used as an insulating bushing.

The inorganic filler content is preferably 15-50 wt %, and more preferably 15-35 wt %, of the total resin composition. Less than 15 wt % does not give the molded resin article enough dimensional stability effect or reinforcing effect, and greater than 50 wt % cannot ensure that the resin material is fluid enough during molding.

The resin component of the present invention is particularly intended to be used an insulating bushing. When used as an insulating bushing, the resin component is preferably a molded resin article of a flame-retardant PC resin (not containing glass fibers) or LCP resin (containing glass fibers). During press-fitting of such an insulating bushing into an aluminum bracket, an LCP resin may not be tough enough and will break during press-fitting if the glass fiber content is greater than 35 wt % of the total resin composition, or will generate press-fitting burrs if the glass fiber content is too low. The PC resins described earlier, on the other hand, are tough, resist generating burrs during press-fitting, and will not break during press-fitting. Therefore, employing these PC resins is especially preferred, for example, in the case that the precision of the aluminum bracket is poor.

The insulating bushing is sealed with an epoxy adhesive after mounting in the aluminum bracket. During this sealing, the insulating bushing is heated to 120° C. To prevent thermal deformation or thermal contraction during heating, the molded resin article preferably has a deflection temperature under load (1.8 MPa) of 120° C. or greater. The deflection temperature under load (1.8 MPa) is measured under a load of 1.8 Mpa as provided by ASTM D-648, or under a load of 1.8 MPa as provided by ISO 75-1 and ISO 75-2.

To shorten the molding cycle of the resin component of the present invention in order to lower the product cost, the resin material of the molded resin article for the resin component preferably has a melt volume-flow rate (MVR) of 5 cm$^3$/10 min or greater measured at 300° C. under a load of 1.2 kg as provided by ISO 1133. A lower MVR cannot ensure that the resin material will be fluid enough, and risks not achieving a shorter molding cycle.

An LCP resin having a resin composition having a glass fiber content of 40 wt % relative to the total resin composition (SUMIKASUPER LCP E6800MR made by Sumitomo Chemical) was used to give an insulating bushing of the shape shown in FIG. 3. When measured using the measurement method described earlier (120° C., 20 hours), the molded resin article had 30 ppm or less outgas. When measured at 80° C. for three hours, the outgas was about 0.5 ppm. The molded resin article had a second-order transition point of 120-150° C., and a deflection temperature under load of 250° C. or greater. A memory disk drive device using the resulting insulating bushing was stable and showed no insulation deterioration of the coil or change over time in precision of reading or writing information. The insulating bushing satisfied the flammability standard UL 94 V-0.

A flame-retardant PC resin (Panlite MN4800 series made by Teijin Chemicals) was used to give an insulating bushing of the shape shown in FIG. 3. When measured using the measurement method described earlier (120° C., 20 hours), outgas from this molded resin article was 30 ppm or less. When measured at 80° C. for three hours, outgas was about 0.4-0.5 ppm. The molded resin article had a second-order transition point of 145-150° C., and a deflection temperature under load of 122° C. The MVR was 7 cm$^3$/10 min. A memory disk drive device using the resulting insulating bushing was stable, and showed no insulation deterioration of the coil or change over time in precision of reading or writing information. The insulating bushing complied with the flammability standard UL 94 V-0.

INDUSTRIAL APPLICABILITY

The memory disk drive device of the present invention can be applied to memory disk drive devices of increasingly higher densities due to its low outgas and improved reliability.

EXPLANATION OF REFERENCE SYMBOLS AND NUMERALS

1 Memory disk drive device
2 Motor
3 Swing arm
4 Carriage
5 Ramp
6 Resin housing
7 Disk
8 Lead
9 Insulating bushing
10 Circuit board

The invention claimed is:

1. A memory disk drive device comprising a motor for causing a memory device to rotate, an insulating bushing for protecting a lead of the motor when the lead is connected to a circuit board; a carriage being molded integrally with a coil for driving a swing arm provided with a pickup head for reading or writing information on a memory disk on a distal end thereof, and said carriage being adapted for balancing the weight of the swing arm; a ramp for retracting the pickup head when the memory disk stops; and a housing for housing the motor, the insulating bushing, the carriage, and the ramp,
wherein each of the lead and a winding wound around a stator core of the motor is a urethane wire;
the insulating bushing being a molded resin article made from an amorphous resin, a crystalline resin, or a liquid crystal polymer resin; and
the molded resin article has 30 ppm or less of outgas as measured using headspace gas chromatography upon sealing 5 g of the molded resin article in air in a tightly sealed 20-mL container and leaving the article to stand at a temperature of 120° C. for 20 hours.

2. The memory disk drive device of claim 1, characterized in that the molded resin article has a second-order transition point of 85° C. or greater.

3. The memory disk drive device of claim 1, characterized in that the molded resin article is an article molded from the amorphous resin, and the amorphous resin is a polycarbonate resin.

4. The memory disk drive device of claim 1, characterized in that the molded resin article is an article molded from the liquid crystal polymer resin, and the liquid crystal polymer resin is an aromatic polyester resin.

5. The memory disk drive device of claim 4, characterized in that the aromatic polyester resin is a copolymer containing repeating units derived from p-hydroxybenzoic acid, dihydroxybiphenyl, and benzene dicarboxylic acid.

6. The memory disk drive device of claim 1, characterized in that the molded resin article is an article molded from the crystalline resin, and the crystalline resin is at least one resin selected from among polyphenylene sulfide resins, polyamide resins, polyether ether ketone resins, and polyimide resins.

7. The memory disk drive device of claim 1, characterized in that the molded resin article is an insulator compounded with an inorganic filler.

8. The memory disk drive device of claim 7, characterized in that the inorganic filler is a fibrous or flaked filler.

9. The memory disk drive device of claim 1, characterized in that the molded resin article has a deflection temperature under load (1.8 MPa) of 120° C. or greater.

10. The memory disk drive device of claim 1, characterized in that the resin material of the molded resin article has a melt volume-flow rate of 5 $cm^3$/10 min or greater as measured at 300° C. under a load of 1.2 kg according to ISO 1133.

* * * * *